June 19, 1962   S. I. KRAMER   3,040,315
PASSIVE RANGE SYSTEM
Filed Jan. 12, 1959

INVENTOR.
STANLEY I. KRAMER
BY
his ATTORNEYS

3,040,315
PASSIVE RANGE SYSTEM
Stanley I. Kramer, Brightwaters, N.Y., assignor to Fairchild Stratos Corporation, a corporation of Maryland
Filed Jan. 12, 1959, Ser. No. 786,405
2 Claims. (Cl. 343—101)

This invention relates to a distance determining apparatus. More particularly, it has to do with an apparatus for determining the distance from a transmitter mounted on a stationary or movable object, such as an aircraft, to a receiver usually mounted on another aircraft.

Previous range determining systems of the type primarily intended for aircraft anti-collision purposes usually comprise a transmitter and a receiver mounted in each craft and require that each transmit and detect signals at a known strength and frequency, and usually include the transmission of information as to factors such as altitude. Another conventional method has been to detect a signal transmitted by a craft first on a direct line from the craft and secondly after it has been reflected from the terrain below. These and other methods have the disadvantages that they require too much equipment and are too dependent upon the nature of the terrain and the reliability of the transmitting and receiving equipment in that they must maintain a constant and known frequency and amplitude.

It is therefore an object of this invention to provide a passive range system which is independent of the nature of the terrain and the amplitude of the transmitted signal.

These and other advantages are attained by providing, in one embodiment of the invention, a passive range system comprising a means at a first unknown position to transmit a first signal at a low frequency and a second signal at a substantially higher frequency; means at a second position to detect the resultant of the intensities of the radiation field and of the induction field produced by the first signal and the resultant of the magnetic intensities of the radiation field and the induction field produced by the second signal, and means to compare the phase of the two resultants.

Figure 2:
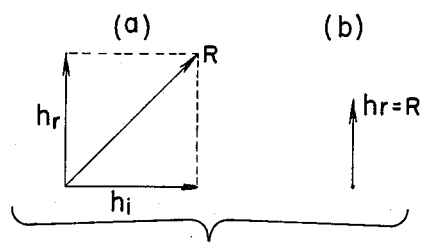
Figure 3:
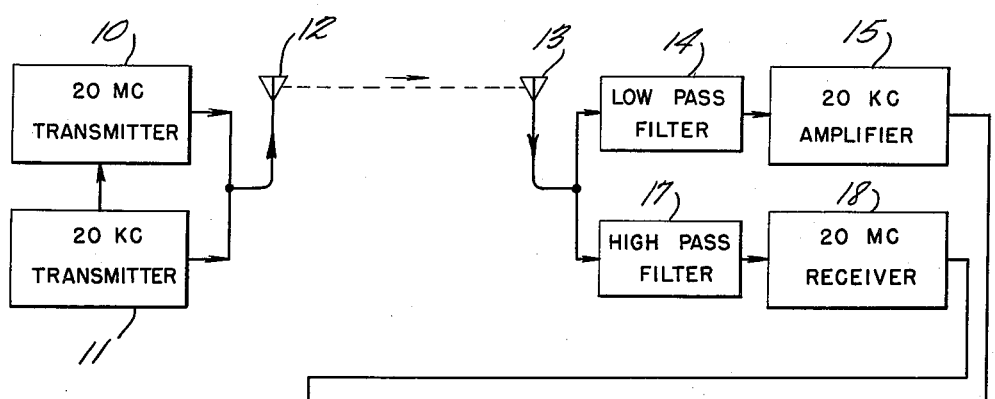

This invention may be better understood from the following detailed description taken in conjunction with the accompanying drawings in which:

FIGURES 1(a) and 1(b) show vector diagrams representing the fields produced by a low frequency signal at a first and at a second instant in time;

FIGURES 2(a) and 2(b) show vector diagrams representing the fields produced by a substantially higher frequency signal at a first and at a second instant in time; and FIGURE 3 is a schematic illustration of an exemplary passive range system constructed according to the invention.

The field in the vicinity of an antenna is made up of a radiation field and an induction field, each in turn being made up of a magnetic field component and an electric field component which must be added together to obtain the fields actually present. The radiation field and the induction field differ in that they are 90° out of phase in time. A further difference between the induction field and the radiation field is the rate at which the two are attenuated. While the magnetic intensity of the radiation field emanating from an antenna diminishes at a rate inversely proportional to the distance, the magnetic intensity of the induction field diminishes at a rate inversely proportional to the square of the distance. The induction field is greater than the radiation field at distances close to the antenna but diminishes more rapidly so that at a distance $$\frac{\lambda}{2\pi}$$

from the antenna the two are equal and at a distance of a few wavelengths the induction field becomes almost negligible in comparison with the radiation field.

The magnetic intensity of the field created by an antenna is given by the formula:

$$h=\frac{1}{4\pi}Il \sin \theta \left[\frac{\sin}{r^2}\left(\omega t-\frac{2\pi r}{\lambda}\right)-\frac{2\pi}{\lambda r} \cos \left(\omega t-\frac{2\pi r}{\lambda}\right)\right]$$

(1)

which includes both the induction field and the radiation field. In this formula $l$ is the length of the wire from which radiation takes place; I is the current flowing in the wire; $\theta$ is the angle of elevation of the point at which the field is desired with respect to a plane perpendicular to the conductor $l$; the quantity $$\frac{\sin}{r^2}\left(\omega t-\frac{2\pi r}{\lambda}\right)$$

represents the induction field and the quantity $$\frac{2\pi}{\lambda r} \cos \left(\omega t-\frac{2\pi r}{\lambda}\right)$$

represents the radiation field; $\lambda$ is the wavelength in meters; and $r$ is the distance between the radiating antenna and the point of detection measured in wavelengths.

It is apparent from this formula that the magnetic intensities of the induction field and the radiation field will vary with the magnitudes of the quantities $$\frac{1}{r^2} \text{ and } \frac{2\pi}{\lambda r}$$

respectively and therefore the vector resultant of the two components and the phase angle between the resultant and the radiation field component will also vary with distance. Therefore, if the phase angle of the resultant of the two components can be determined, the distance from the transmitter can also be calculated from Formula 1.

In order to measure the phase angle, a reference must first be established. As was previously explained, the induction field attenuates rapidly and is negligible after a few wavelengths. Therefore it is proposed to transmit two signals, one at a high frequency and one at a low frequency so that, at a distance from the antenna of at least a few wavelengths of the high frequency, the induction field component of the high frequency signal will be nearly absent and the resultant will be nearly equal to the radiation field component and will be constant so that it can be used as a reference from which to measure the angle of the resultant of the field created by the low frequency signal.

Figure 1:
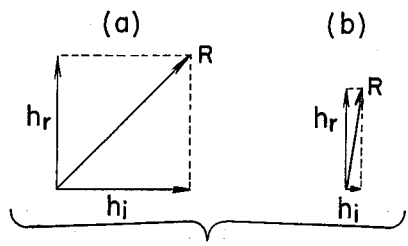

These principles are graphically illustrated in FIGURES 1 and 2. In FIGURE 1, there is shown vectorially the magnetic intensity of the field set up by a 20 kc. signal comprising the radiation field $h_r$, the induction field $h_i$ and R the vector sum of the two. FIGURE 1(a) is at a short distance from the antenna measured in wavelengths while FIGURE 1(b) is at a distance of 75,000 meters or 5 wavelengths from the antenna. At the latter position the ratio of the induction field component to the radiation field component is approximately .03 and the phase angle between the resultant and the radiation field component is approximately 1.8°.

In FIGURES 2(a) and 2(b), there are shown the vector diagrams for a 20 mc. signal. FIGURE 2(a) again illustrates the relative field strengths at a position quite close to the radiating antenna while FIGURE 2(b) illustrates the fields at a position 75,000 meters or 5,000 wavelength from the radiating antenna at which point the induction field is almost negligible and the resultant is just about equal to the radiating field. Therefore the phase angle of the resultant of the 20 mc. signal is constant and can be used as a reference and the angle of the resultant of the 20 kc. signal will become smaller with distance, so that, if the angle between the two resultants can be measured, it will be indicative of the distance from the radiating antenna.

An apparatus constructed according to one embodiment of the invention for measuring the angle between the two resultants is shown in FIGURE 3. Two transmitters 10 and 11 transmitting on frequencies of 20 mc. and 20 kc., respectively, are connected to feed either a single antenna 12 or separate antennas if desired. A portion of the 20 kc. signal is used to modulate the 20 mc. transmitter so that two signals are transmitted by the antenna 12, one an unmodulated 20 kc. signal and another modulated 20 mc. signal.

These two signals are picked up by an antenna 13, and the 20 kc. signal passes through a low pass filter 14 to an amplifier 15 while the modulated 20 mc. signal is passed by a high pass filter 17 to a conventional receiver 18 which selects the modulation frequency. The outputs from the amplifier and the receiver are connected to a phase detector 16 which produces an output signal representative of the phase difference between the two input signals. The output from the phase detector is connected to the input to a range detector 19 which may be calibrated directly in distance.

The transmitting equipment could consist of two simple low power transmitters which may be one tube oscillators and which could feed a single spiral wound whip antenna. The receiving antenna 13 should be an isotropic receiving antenna which will add vectorially the induction and the radiation fields. The 20 mc. receiver may be a conventional tuned radio-frequency receiver or it may be a superheterodyne receiver with a band width of 40 kc., for example, to cover both sidebands. The high pass filter, the low pass filter and the 20 kc. amplifier are all conventional. The phase detector 16 may be a conventional model of the type available from Technology Instrument Corporation, their model type 320A, while the range computer may be simply a meter with a nonlinear scale calibrated in range. It should be understood that the frequencies and the components specified are intended to be illustrative of a specific embodiment of the invention and the invention and the claims are not to be limited thereto since it is obvious that other frequencies and components could be used.

It can therefore be seen that the applicant has provided a novel and useful passive range system for determining the distance from a transmitter to a receiver. The apparatus is independent of the terrain and is also independent of the amplitude of the transmitted signals provided that they are large enough to be detected. Therefore, such variables as the absolute amplitudes of the transmitters, receiver performance, receiving antenna gain, orientation, terrain and atmospheric conditions can not effect the accuracy of the system and it will provide completely accurate results in a range up to approximately 50 miles when using the frequencies of 20 kc. and 20 mc. The range of the system will vary somewhat depending upon the frequencies chosen and the quality of the detecting equipment since at distances of more than six or seven wavelengths of the low frequency signal the phase angle becomes very small and difficult to accurately determine.

While particular embodiments of the present invention have been shown and described for purposes of illustration, it is apparent that changes and modifications may be made without departing from this invention in its broader aspects. For example, other means could be employed for providing a reference signal from which to measure the phase of the low frequency signal, such as transmitting pulses over a microwave channel which are synchronized with the low frequency signal. Also other means could be employed for comparing the radiation field with the induction field. Since the induction field is polarized in space at right angles to the radiation field it is possible to receive specific signals by using polarized antennas. Therefore the invention described herein is not to be construed as limited to the specific embodiment described but is intended to encompass all modifications thereof coming within the scope of the following claims.

I claim:

1. A passage range system comprising a transmitter, an antenna connected to the output from said transmitter, said transmitter and said antenna being adapted to create a field composed of a radiation field component and an induction field component, and means at a receiving point to measure the phase angle between said radiation field component and the resultant of said induction field component and said radiation field component.

2. A passive range system comprising a transmitter, an antenna connected to the output from said transmitter, said transmitter and said antenna adapted to create a field composed of an induction field component and a radiation field component, a second transmitter adapted to generate a reference phase signal, means to detect said induction field component and said radiation field component created by said first transmitter, and means at a receiving point including means to detect said reference phase signal, and means to measure the phase angle between said reference phase signal and the resultant of said radiation field component and said induction field component.

References Cited in the file of this patent
UNITED STATES PATENTS
2,248,215    Budenbom _____ July 8, 1941